Aug. 18, 1964 F. S. BRILES 3,144,803
NUT AND WASHER ASSEMBLY
Filed Aug. 11, 1959
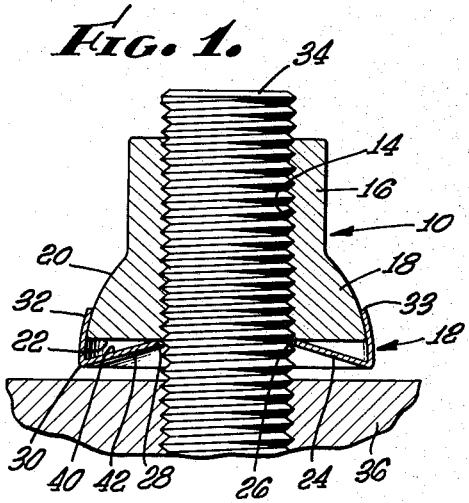
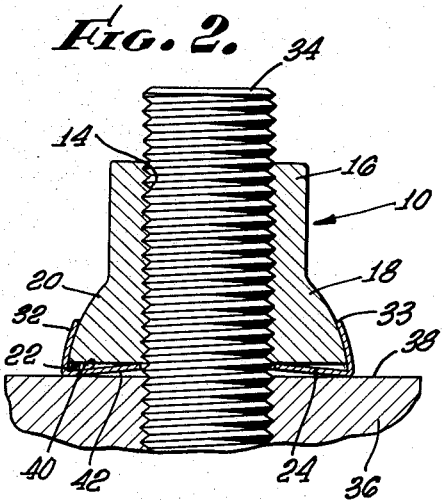
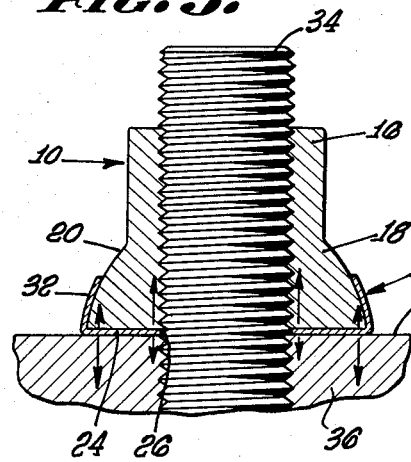
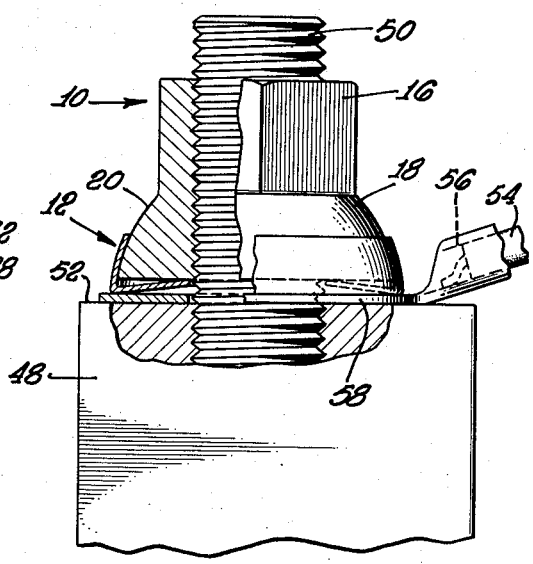
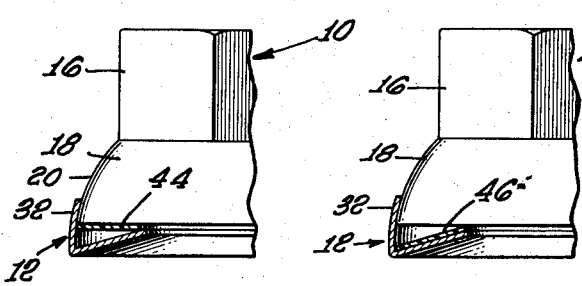
INVENTOR.
FRANKLIN S. BRILES
BY
Huebner & Worrel
ATTORNEYS.

3,144,803
NUT AND WASHER ASSEMBLY
Franklin S. Briles, 6 Middleridge Lane N., Rolling Hills, Calif.
Filed Aug. 11, 1959, Ser. No. 833,029
1 Claim. (Cl. 85—32)

The present invention relates to a nut and captive washer assembly adapted to be tightened up on a bolt or threaded stud extending through a surface of a structural member, and it relates particularly to a combination of a nut and a captive washer in which the washer is so constructed that it will be restrained against rotation relative of the surface of the structural member as the nut and washer are being tightened down against the surface, whereby galling or scoring of the surface is prevented.

When a conventional nut or nut and washer combination is tightened down on a bolt or stud against a bearing surface, the surface is likely to be galled or scored by rotation of the nut or washer against the bearing surface. Such galling is often disadvantageous. For example, where bolted structural connections are preloaded it is desirable to accurately determine the amount of load or tension applied to the bolt when the nut is tightened to its final position on the bolt, as where preloading is specified in the narrow range above yield and below ultimate failure. Such preloading could conveniently be held within the desired close limits of tolerance by control of the amount of torque applied to the nut if a consistent relationship could be established between the amount of torque applied to the nut and the tensile load applied to the bolt. However, relatively wide variations in the relationship between the amount of torque applied to the nut and the resulting tension in the bolt are caused by galling or scoring of the surface of the structural member, so that a conventional nut or nut-washer combination is often unsatisfactory in such prestressed connections.

Galling or scoring between the under-surface of a nut, or a washer under a nut, and the mating surface of a part against which the nut or washer is tightened may constitute a serious limitation on the maximum loading of many engineered structures, inasmuch as such galling occurs on surfaces adjacent to highly stressed regions of the part, thus lowering the fatigue endurance of the part. Since the galling or scoring effect is extremely erratic, many structures must be undesirably "beefed up" in size and weight to allow for the possibility of galling or scoring.

In view of these and other problems in the art, it is an object of the present invention to provide a nut and washer assembly which will consistently and dependably function upon set-up in a structure to come to full-set without galling, thereby permitting preloading to be accurately determined by the amount of torque applied to the nut, and permitting the loading of some parts to a substantially greater degree than in constructions in which the maximum loading must be reduced to allow for the possibility of galling.

Another object of the present invention is to provide a nut and captive washer combination in which the operative base portion of the washer that is disposed between the bottom of the nut and the bearing surface against which the nut-washer combination is tightened is of frusto-conical configuration, tapering downwardly and outwardly from the inner edge of the washer to the other peripheral edge of the washer, whereby the inner edge of the washer first engages the bottom face of the nut and the outer peripheral edge of the washer first engages the bearing surface as the nut-washer combination is tightened down against the surface. By this means, the frictional holding force of the bearing surface against the outer peripheral edge of the washer will be applied through a greater torque arm than the frictional driving force of the bottom face of the nut against the inner edge of the washer, whereby the washer is restrained against rotating relative to the bearing surface, and hence will not gall or score the bearing surface as the nut is tightened.

Another object of the present invention is to provide a nut and washer combination of the character described in which an anti-friction element is operatively disposed between the bottom face of the nut and the upper face of the washer, to increase the freedom of rotation of the nut relative to the washer as the nut and washer are being tightened down against a bearing surface, as a further protection against galling of the surface by the washer.

It is also an object of the present invention to provide a nut-washer assembly of the character described in which the base, operative portion of the washer is composed of resilient material, whereby the frictional holding force of the bearing surface against the outer edge of the washer will remain greater than the frictional driving force of the nut against the inner edge of the washer during the entire process of tightening the nut and washer down against the surface, to insure against rotation of the washer relative to the surface even when the washer becomes highly compressed during the tightening of the nut. This resilient washer construction also permits the nut-washer combination to be removed from the bolt and reapplied repeatedly without appreciable damage to the washer.

Further objects and advantages of this invention will appear during the course of the following part of this specification wherein the details of construction and mode of operation of a preferred embodiment are described with reference to the accompanying drawing, in which:

FIG. 1 is a vertical axial sectional view of my nut and washer assembly in position on a bolt, free of the bearing surface;

FIG. 2 is a view similar to FIG. 1, but with the device in contact with the bearing surface, and with the washer partly compressed;

FIG. 3 is another view similar to FIG. 2, but with the washer fully compressed between the nut and the bearing surface;

FIG. 4 is a fragmentary side elevational view, partly in section, showing a dry anti-friction element in position on the lower surface of the nut member;

FIG. 5 is a view similar to FIG. 4, but with the anti-friction element in position on the upper surface of the washer;

FIG. 6 is an elevational view, partly in section, similar to FIG. 2, showing the device employed for attaching an electrical lead to a terminal.

Referring to the drawings, my present invention comprises a nut 10 in combination with a captive washer 12. The nut 10 has a central threaded bore 14 and includes an upper wrenching portion 16 and a lower flange or washer retaining portion 18. The flange or washer retaining portion 18 is preferably annular, and has an upwardly directed shoulder 20 thereon for retaining the washer 12 on the nut. The bottom face 22 of the nut is preferably flat and disposed at right angles to the axis of bore 14.

The washer 12 comprises a base portion 24 adapted to be disposed directly under the nut between the bottom face 22 of the nut and the work. The base portion 24 of washer 12 is provided with a central opening 26 that is preferably slightly larger in diameter than the grooves in the central threaded bore 14 of nut 10, so that the washer will not bind on the threads of a bolt or stud on which the nut-washer assembly may be engaged.

The base portion 24 of washer 12 tapers downwardly and outwardly from its inner edge 28 at opening 26 to its outer peripheral edge 30, and is preferably of frusto-conical configuration.

The washer 12 is provided with an integral, upturned peripheral retaining lip 32, the lip 32 curving radially inwardly toward its upper edge 33 so as to loosely lap over the shoulder 20 on the flange portion 18 of nut 10. This loose engagement of the washer 12 relative to nut 10 permits them to be turned relative to each other, but not separated.

Although I prefer to provide the shoulder 18 on the nut and the upturned peripheral retainer lip 32 as continuous annular members, if desired one of these members may be of irregular or interrupted form, the other being annular, without interferring with the freedom of rotation of the washer 12 on the nut 10. For example, if desired, the annular lip 32 could be replaced by a plurality of upwardly and inwardly directed fingers (not shown) which would serve to retain the washer 12 on the nut 10.

The nut and washer combination of the present invention has been illustrated in FIGS. 1, 2 and 3 of the drawing in operative position on a bolt or stud 34 extending upwardly through a structural member 36, the bolt or stud 34 being normal to a flat bearing surface 38 of the structural member 36. In FIG. 1, the nut-washer assembly is spaced upwardly from the bearing surface 38 as the assembly is being screwed down on the stud or bolt 34. In FIG. 2, the nut-washer assembly is shown in the process of being tightened down against the surface 38, with the frusto-conical base portion 34 partially compressed; and in FIG. 3, the assembly has been fully tightened down against the bearing surface so that the base portion 24 of the washer has been completely flattened between the bottom face 22 of the nut and the bearing surface 38.

In operation, as the nut-washer assembly is screwed down on the bolt or stud 34, the washer 12 will first engage the bearing surface 38 at the outer peripheral edge 30, and will first engage the bottom face 22 of the nut at the inner edge 28. Until the washer is completely flattened as in FIG. 3, the entire compressive force between the washer and the bearing surface will be applied at the outer edge 30 of the base portion of the washer, while the entire compressive force between the washer and the nut will be applied between the inner edge 28 of the base portion of the washer and the bottom face 22 of the nut.

Thus, during the phase of the tightening in which the washer is being flattened, but while the upper surface 40 of the base portion 24 of the washer is still out of flush engagement with the bottom face 22 of the nut and the bottom surface 42 of the base portion 24 of the washer is still out of flush engagement with the bearing surface 38, the frictional force of the bearing surface 38 against the washer tending to hold the washer against rotation relative to the bearing surface 38 will be applied through a torque arm substantially equal to the radius of the outer edge 30 of the base portion of the washer. At the same time, the frictional force of the bottom of the nut against the washer tending to hold the washer against rotation relative to the nut, and hence tending to drive the washer in rotary movement relative to the fixed surface 38, is applied to the washer with a torque arm substantially equal to the radius of the inner edge 28 of the base portion 24. Since the total compressive force of the bearing surface 38 on the washer is equal to the compressive force of the nut against the washer, this difference in torque arm lengths results in greater frictional holding torque between the bearing surface 38 and the washer than the frictional driving torque between the nut and the washer, causing the washer to remain fixed rotatably relative to the surface 38, while the nut rotates over the washer.

I prefer to provide a washer in which the base portion 24 is resilient, so that even after the base portion 24 has been completely flattened between the nut and the bearing surface below the nut, the outer peripheral region of the washer will exert more downward force on the bearing surface than upward force on the nut, and the inner edge portion of the washer will exert more upward force on the nut than downward force on the bearing surface, as illustrated diagrammatically by the force arrows in FIG. 3.

Thus, even after the nut has been tightened down to the point where the bolt is highly stressed, the frictional holding torque of the bearing surface against the washer will still be greater than the frictional turning or driving torque of the nut against the washer, so that the washer will remain fixed relative to the bearing surface.

Resiliency of the washer also prevents the washer from taking a permanent set when its base portion 24 is flattened under compression, making the washer re-usable any desired number of times.

Although the resiliency factor of the washer is not in any way critical, I have found that a Rockwell C hardness of between about 30 and about 50 will give the desired resiliency of the washer. If desired, the hardness of the washer may vary between surface and internal regions, as, for example, where the washers may be casehardened.

An additional factor which tends to cause relative rotation between the washer and nut rather than between the washer and the work surface even after the washer has been completely flattened as in FIG. 3, is that once relative rotation commences between the nut and washer, the abutting surfaces of the nut and washer tend to become polished, with a consequent reduction in the coefficient friction therebetween.

The frictional drag between the nut and washer may further be reduced as compared with that between the bearing surface and the washer by providing an anti-friction element between the nut and the washer. This anti-friction element may be provided on the bottom face 22 of the nut as at 44 in FIG. 4, or on the top surface 40 of the base portion of the washer, as at 46 in FIG. 5. The anti-friction elements 44 and 46 may be composed of dry anti-friction material, such as one of the fluoro-carbon resins, nylon, or resins carrying dispersions of molybdenum disulphide or graphite. The anti-friction elements 44 and 46 may be provided either as integral coatings applied respectively to the nut or washer, or may comprise separate, thin anti-friction washers.

It will be apparent from the foregoing description of the presently preferred structure and operation of my nut and washer assembly that at all times during the tightening of the assembly down against the work, the washer will remain fixed rotationally relative to the work, so that there is no possibility of any galling or scoring of the work surface. Accordingly, there will be a substantially fixed or determinable relationship between the amount of torque applied during the tightening of the nut and the amount of prestressing or tensioning set up in the bolt or stud. Also, maximum loading of the work may be taken advantage of without having to allow for undesired stress concentrations likely to result from galling.

I have found that my present nut and washer assembly is also useful in clamping electrical leads to terminals or other members in that the lead will not be rotated by my device as the nut is tightened. I have illustrated this application of the present invention in FIG. 6, in which a terminal post 48 is provided with an upstanding stud or bolt member 50, the stud or bolt 50 being disposed at right angles to the flat contacting face 52 of the terminal post.

An electrical conductor 54 is shown as attached to a collar 56 forming an integral part of an electrically conducting eyelet 58 which is adapted to be disposed over the stud or bolt 50 in contact with the fact 52 of the terminal post. Although the outer diameter of the eyelet 58 is not in any way critical, it is preferably at least as large as or slightly larger than the diameter of the outer edge 30 of the washer.

As the nut and washer assembly is tightened down on the stud or bolt 50 to clamp the eyelet 58 against the face 52 of the terminal post, the nut will rotate relative to the washer, but the washer and the eyelet 58 will both remain fixed relative to the terminal post surface 52 for the reasons hereinabove set forth.

Thus, the use of my nut and washer assembly completely overcomes the usual difficult problem of adequately tightening the end of an electrical lead against a conductor member without twisting and damaging the end of the lead and causing an uncertain connection, both electrically and mechanically.

While the instant invention has been shown and described herein in what is conceived to be the most practical and preferred embodiment, it is recognized that departures may be made therefrom within the scope of the invention which is therefore not limited to the details disclosed herein, but is to be accorded the full scope of the claim.

Having described my invention, what I claim as new and desire to secure by Letters Patent is:

A nut and captive washer assembly comprising: a nut member having a central threaded bore extending therethrough to render the nut mateable with a threaded member, said nut member including a wrenching portion, an annular flange portion adjacent said wrenching portion, and a flat base disposed at substantially right angles to the bore and extending from the bore radially outwardly to the periphery of said flange portion, said flange portion being in the form of an annular segment of a sphere with the convergence of said annular flange portion being toward said wrenching portion, with the diameter of said flange portion in the region of said wrenching portion being less than the diameter of said flat base; and a resilient captive washer having a central opening therein with a diameter larger than the diameter of the bore with which it aligns, said washer including a peripherally continuous skirt which is complementary to the form of said annular flange portion and is in encircling, loosely contacting relationship with said annular flange portion and at least partially overlying the same, and a deformable base portion having a frusto-conical configuration embodying a crown and a peripherally continuous, smooth, outer peripheral edge integral with said skirt, the crown being proximate the base of said nut member, and the outer peripheral edge being spaced from the base of said nut member and adapted to initially, frictionally, contact a bearing surface to override the contacting engagement and rotation of said washer occurring due to the rotation of said nut member in one direction to a terminal position, thus deforming the washer between the base of said nut member and the bearing surface to render the washer substantially flat, whereby substantially the entire base portion of the washer is in frictional and compressive engagement with the bearing surface, whereby the outer peripheral edge of said base portion of the washer produces force on the bearing surface and on the nut member, with more resistance to rotation being present at the bearing surface than at the nut member, and return of said washer to substantially its original form is achieved when said nut member is rotated in a second direction opposite said one direction.

References Cited in the file of this patent

UNITED STATES PATENTS

| | | |
|---|---|---|
| 296,093 | Wells | Apr. 1, 1884 |
| 1,371,596 | Baxter | Mar. 15, 1921 |
| 1,435,216 | Davis et al. | Nov. 14, 1922 |
| 1,882,089 | Olson | Oct. 11, 1932 |
| 2,151,919 | Jacobson | Mar. 28, 1939 |
| 2,464,152 | Ralston | Mar. 8, 1949 |
| 2,721,089 | Shames | Oct. 18, 1955 |

FOREIGN PATENTS

| | | |
|---|---|---|
| 1,315 of 1901 | Great Britain | Jan. 21, 1901 |
| 255,090 | Germany | Apr. 7, 1912 |
| 341,333 | Great Britain | Jan. 15, 1931 |
| 975,932 | France | Oct. 17, 1950 |
| 1,002,976 | France | Nov. 14, 1951 |